(12) United States Patent
Tenny et al.

(10) Patent No.: US 10,251,208 B2
(45) Date of Patent: Apr. 2, 2019

(54) SYSTEM AND METHOD FOR CONNECTION MANAGEMENT

(71) Applicant: Futurewei Technologies, Inc., Plano, TX (US)

(72) Inventors: Nathan Edward Tenny, Poway, CA (US); Xuelong Wang, Beijing (CN); Haibo Xu, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 14 days.

(21) Appl. No.: 15/363,714

(22) Filed: Nov. 29, 2016

(65) Prior Publication Data

US 2018/0049261 A1 Feb. 15, 2018

Related U.S. Application Data

(60) Provisional application No. 62/373,859, filed on Aug. 11, 2016.

(51) Int. Cl.
| | |
|---|---|
| *H04W 76/15* | (2018.01) |
| *H04W 76/19* | (2018.01) |
| *H04W 36/00* | (2009.01) |
| *H04W 84/04* | (2009.01) |
| *H04W 88/06* | (2009.01) |

(52) U.S. Cl.
CPC .......... *H04W 76/15* (2018.02); *H04W 76/19* (2018.02); *H04W 36/0079* (2018.08); *H04W 84/042* (2013.01); *H04W 88/06* (2013.01)

(58) Field of Classification Search
CPC ............... H04L 29/06027; H04L 29/06; H04L 65/1069
See application file for complete search history.

(56) References Cited

U.S. PATENT DOCUMENTS

| 7,400,895 B2 | 7/2008 | Chang et al. | |
|---|---|---|---|
| 2013/0067068 A1* | 3/2013 | Hassan | H04W 76/02 709/224 |

FOREIGN PATENT DOCUMENTS

| CN | 101998661 A | 3/2011 |
|---|---|---|
| CN | 102196590 A | 9/2011 |

(Continued)

OTHER PUBLICATIONS

"Digital cellular telecommunications system (Phase 2+) (GSM); Universal Mobile Telecommunications System (UMTS); LTE; 3GPP System Architecture Evolution (SAE); Security architecture", ETSI TS 133 401 V13.3.0, Technical Specification, Aug. 2016, 151 pages.

(Continued)

*Primary Examiner* — Chandrahas B Patel
(74) *Attorney, Agent, or Firm* — Slater Matsil, LLP

(57) ABSTRACT

A method for connection management by a user equipment includes transmitting a re-establishment request for a first connection of a first protocol layer in response to determining that a connection re-establishment condition is met, receiving a re-establishment response indicating if a re-establishment of the first connection of the first protocol layer is allowed, and completing the re-establishment of the first connection of the first protocol layer when the re-establishment of the first connection of the first protocol layer is allowed, wherein a context of a second protocol layer of the user equipment is unchanged.

25 Claims, 11 Drawing Sheets

(56) References Cited

FOREIGN PATENT DOCUMENTS

KR    20050108233 A    11/2005
WO      2009096883 A1     8/2009

OTHER PUBLICATIONS

"LTE; Evolved Universal Terrestrial Radio Access (E-UTRA) and Evolved Universal Terrestrial Radio Access Network (E-UTRAN); Overall description; Stage 2 (3GPP TS 36.300 version 13.4.0 Release 13)", ETSI TS 136 300, V13.4.0, Technical Specification, Aug. 2016, 322 pages.

"Completion of the procedures for RRC connection establishment and reestablishment", TSG-RAN Working Group 2 (Radio layer 2 and Radio layer 3, TSGR2#4(99)416, Ericsson, Agenda Item 6.8, Berlin, Germany, May 25-28, 1999, 5 pages.

\* cited by examiner

SYSTEM AND METHOD FOR CONNECTION MANAGEMENT

This application claims the benefit of U.S. Provisional Application No. 62/373,859, filed on Aug. 11, 2016, entitled "System and Method for Connection Management," which application is hereby incorporated herein by reference.

TECHNICAL FIELD

The present invention relates generally to a system and method for digital communications, and, in particular embodiments, to a system and method for connection management.

BACKGROUND

In the Third Generation Partnership Project (3GPP) Long Term Evolution (LTE) compliant communications systems (as well as earlier cellular communications systems), the connection re-establishment feature used for recovering from radio link failure or handover failure is a relatively unoptimized process. This is due partly to the protocol architecture, e.g., an assumption made wherein a radio link failure and/or handover failure (RLF/HOF) by definition breaks the radio resource control (RRC) connection, thereby requiring a Layer 3 recovery procedure with full configuration of the user equipment (UE); and partly because such failures are seen as an error case that should be focused on avoiding the problem and not optimizing the response to the problem.

SUMMARY

Example embodiments provide a system and method for connection management.

In accordance with an example embodiment, a method for connection management is provided. The method includes transmitting, by a user equipment (UE), a re-establishment request for a first connection of a first protocol layer in response to determining that a connection re-establishment condition is met, receiving, by the UE, a re-establishment response indicating if a re-establishment of the first connection of the first protocol layer is allowed, and completing, by the UE, the re-establishment of the first connection of the first protocol layer when the re-establishment of the first connection of the first protocol layer is allowed, wherein a context of a second protocol layer of the UE is unchanged.

In accordance with an example embodiment, a method for connection management is provided. The method includes receiving, by a first network device, a re-establishment request for a first connection of a first protocol layer from a UE, determining, by the first network device, if a context of the UE is available at the first network device, determining, by the first network device, if the context of the UE is retrievable from a second network device when the context of the UE is not available at the first network device, and transmitting, by the first network device, a re-establishment response indicating that a re-establishment of the first connection of the first protocol layer is allowed when the context of the UE is available at the first network device or is retrievable from the second network device when the context of the UE is not available at the first network device, wherein a context of a second protocol layer of the UE is unchanged during the re-establishment of the first connection of the first protocol layer.

In accordance with an example embodiment, a UE is provided. The UE includes a non-transitory memory storage comprising instructions, and one or more processors in communication with the non-transitory memory storage. The one or more processors execute the instructions to transmit a re-establishment request for a first connection of a first protocol layer in response to determining that a connection re-establishment condition is met, receive a re-establishment response indicating if a re-establishment of the first connection of the first protocol layer is allowed, and complete the re-establishment of the first connection of the first protocol layer when the re-establishment of the first connection of the first protocol layer is allowed, wherein a context of a second protocol layer of the UE is unchanged.

In accordance with an example embodiment, a first network device is provided. The first network device includes a non-transitory memory storage comprising instructions, and one or more processors in communication with the non-transitory memory storage, wherein the one or more processors execute the instructions to receive a re-establishment request for a first connection of a first protocol layer from a UE, determine if a context of the UE is available at the first network device, determine if the context of the UE is retrievable from a second network device when the context of the UE is not available at the first network device, and transmit a re-establishment response indicating that a re-establishment of the first connection of the first protocol layer is allowed when the context of the UE is available at the first network device or is retrievable from the second network device, wherein a context of a second protocol layer of the UE is unchanged during the re-establishment of the first connection of the first protocol layer.

Practice of the foregoing embodiments enables a Layer 2 link re-establishment and recovery procedure from a radio link failure and/or handover failure, which makes the recovery at a Distributed Unit level, transparent to the Centralized Unit and Layer 3 protocols. Therefore, the recovery process is shortened as compared to the Layer 3 link re-establishment procedures practiced in the existing art and limits interruptions to the user experience.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

Figure 1:
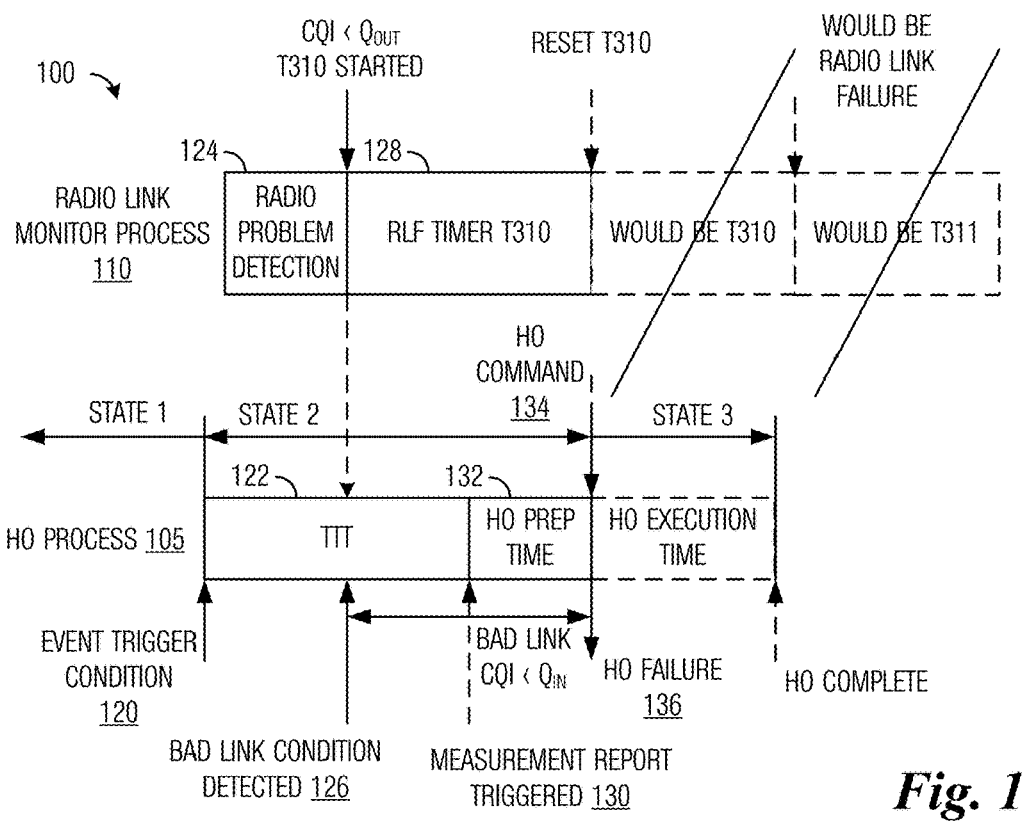
FIG. 1 illustrates a diagram highlighting a 3GPP LTE radio link failure (RLF) recovery scenario with a handover failure (HOF) involving a too late handover (HO)

FIG. 1 illustrates a diagram 100 highlighting a 3GPP LTE radio link failure (RLF) recovery scenario with a handover failure (HOF) involving a too late handover (HO). A first trace 105 represents a HO process and a second trace no represents a radio link monitor process. As shown in first trace 105, the HO process is initially in STATE 1 until an event trigger condition 120 is determined and the HO process enters STATE 2 and initiates a time to trigger (TTT) 122. Examples of event triggers include a signal quality of a neighbor becomes an offset better than the signal quality of primary cell (PCell) or primary secondary cell (PSCell), the signal quality of a PCell or PSCell becomes worse than a first threshold and the signal quality of a neighbor becomes better than a second threshold, the signal quality of a neighbor becomes an offset better than the signal quality of a secondary cell (SCell), and so forth. However, a radio problem is detected (shown as block 124 of second trace no) and a bad link condition is detected at time 126 and a RLF timer T310 is started (block 128). As an example, the bad link condition occurs when the channel quality indicator (CQI) is less than a quality threshold ($Q_{OUT}$).

At time 130, a measurement report is triggered and the HO process initiates a HO preparation (prep) time (block 132). A HO command is issued at time 134, but due to the link quality issue, the HO command is not received, meaning that the HO fails 136. The HO is declared a failure (the HO is noted as being too late of a HO) because the timer T310 is triggered or running when the failure occurs, i.e. when the HO command should have been received by the user equipment (UE). The failure is considered by the UE to be a RLF and/or physical downlink control channel (PDCCH) failure occurring in source cells (the originator of the HO). It is noted that the HO failure is not detected as such by the UE because the UE does not receive the HO command. The remainder of the HO process and the radio link monitor process do not continue and are shown as dashed lines.

Figure 2:
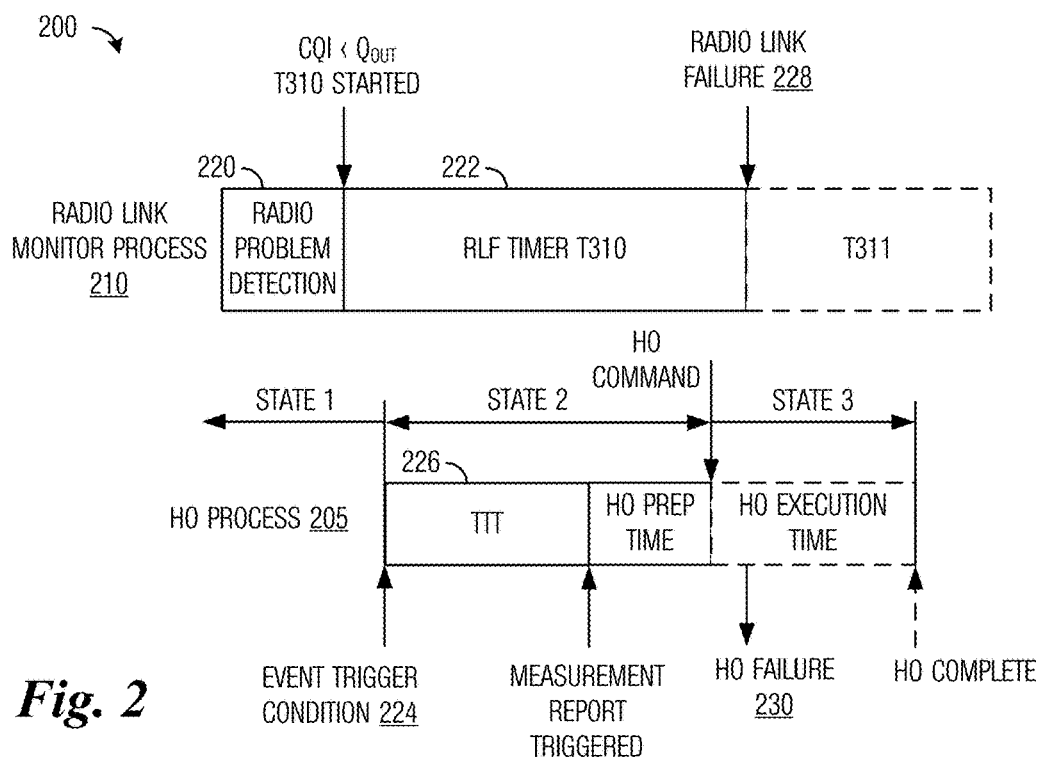
FIG. 2 illustrates a diagram highlighting a 3GPP LTE RLF recovery scenario with a HOF involving a too early HO.

FIG. 2 illustrates a diagram 200 highlighting a 3GPP LTE RLF recovery scenario with a HOF involving a too early HO. A first trace 205 represents a HO process and a second trace 210 represents a radio link monitor process. As shown in second trace 210, a radio problem is detected (block 220) and a RLF timer T310 is started (block 222). In the meantime, the HO process is initially in STATE 1 until an event trigger condition 224 is determined and the HO process enters STATE 2 and initiates a TTT 226. However, RLF timer T310 expires at time 228 and a HO failure is asserted (time 230). The HO failure is declared when RLF timer T310 expires while the HO process is in STATE 3. The failure is considered to be a RLF and/or PDCCH failure occurring in target cells (the intended recipient of the HO). The remainder of the HO process and the radio link monitor process do not continue and are shown as dashed lines.

In general, the 3GPP LTE HO procedure is a network controlled with UE assistance mobility technique. HO related information is exchanged between the UE and a source evolved NodeB (eNB). The radio conditions need to be good enough to allow the source eNB to decode the measurement reports from the UE and subsequently prepare a target cell for HO. Furthermore, the radio conditions need to be good enough for the UE to be able to decode the HO command from the source eNB.

The 3GPP LTE radio resource control (RRC) connection re-establishment procedure utilizes UE-based mobility and provides a recovery mechanism after RLF or when the HO signaling with the source eNB partially fails due to poor radio conditions. The radio conditions need to be good enough for the source eNB to decode the measurement reports from the UE and subsequently prepare the target cell for HO, but this scenario occurs when conditions are not good enough for the UE to be able to decode the HO command from the source eNB (as described in FIG. 1), or when the UE receives the HO command but has a RLF in the target cell. Upon expiration of the RLF timer (T310), the UE searches for a suitable target cell and attempts to re-establish its connection with the target cell while remaining in the connected state. The re-establishment is successful if the target cell has been prepared by the source eNB (i.e., the UE context is already prepared, such as when the target cell is hosted by the source eNB, for example).

A 3GPP LTE RRC connection re-establishment failure leads to a non-access stratum (NAS) recovery procedure. NAS recovery may be described as UE-based mobility and is triggered if the target cell is not prepared when the UE attempts re-establishment. Generally, this means that the UE is coming from a RLF, e.g., the radio conditions were not good enough for the source eNB to decode the measurement reports from the UE. Consequently, the source eNB does not prepare the target cell for a HO. However, the 3GPP LTE RRC connection re-establishment failure may also reflect a HO to wrong cell case, meaning that the source eNB prepared a target cell for a HO but the UE acquired a cell different from the one that was prepared. With NAS recovery, the UE does not remain in the connected state; instead, upon re-establishment failure, the UE transitions from the connected state to an idle state and attempts to establish a new connection.

The UE context as maintained at the eNB in 3GPP LTE includes:

Access Stratum (AS) Config Information Element (IE): contains information about RRC configuration information at the source eNB that can be used by the target cell to determine a need to change the RRC configuration during a HO preparation phase. The information may also be used after the HO is successful or during the RRC connection re-establishment;

AS Context IE: used to transfer local evolved universal terrestrial access network (E-UTRAN) context required by the target cell;

ReestablishmentInfo IE: includes CellIdentity of both source and target, Key-eNodeB-Star (KeNB*)—a parameter used for security during the handover (only used for an X2 HO, and ignored by the target cell in an S1 HO), and ShortMAC-I of both source and target; and Radio Resource Management (RRM)-Config IE: contains UE specific RRM information before the HO which can be used by the target cell.

In a forward HO (a situation wherein a UE is connected to a first cell and changes to a second cell without instruction from the first cell) with UE context fetch, the forward HO may be described as UE-based mobility supported by a context fetch. Upon expiration of the RLF timer (T310), the UE searches for a suitable target cell and attempts to re-establish connection with the target cell while remaining in the connected state. If the target cell is not prepared, the eNB controlling the target cell fetches the UE's context from the source eNB. The forward HO will incur an additional delay versus the normal HO procedure and, consequently, a longer interruption in service. The delay is due to RRC signaling overhead and the time for the eNB controlling the target cell to fetch the UE context (which is case and implementation dependent). It is noted that whether the eNB controlling the target cell was already prepared or has to fetch the context of the UE at re-establishment may be transparent to the UE.

Figure 3:
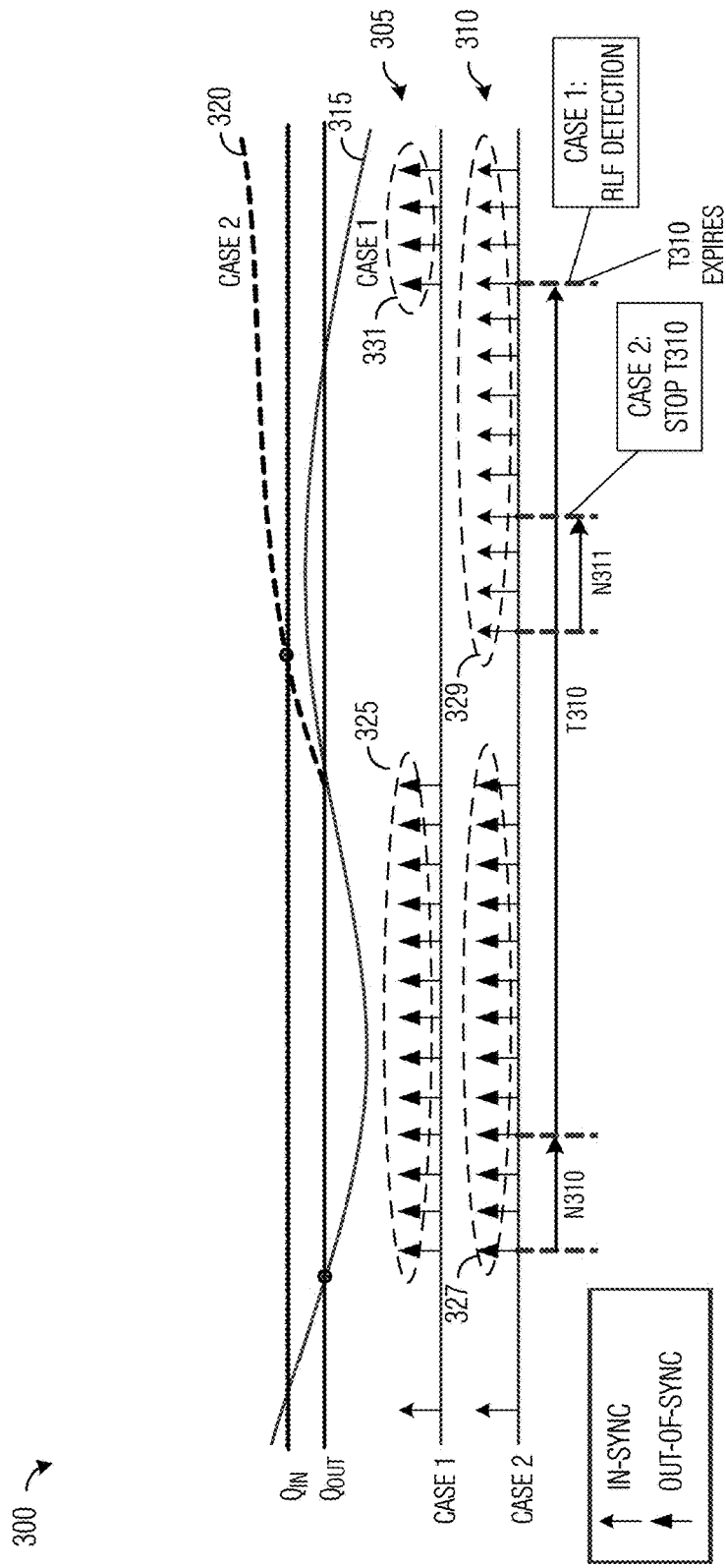
FIG. 3 illustrates a diagram of the effects of filtering applied by an upper layer entity to in sync and out of sync indicators received from a physical (PHY) layer entity.

FIG. 3 illustrates a diagram 300 of the effects of filtering applied by an upper layer entity to in sync and out of sync indicators received from a physical (PHY) layer entity. Counter values used for RLF monitoring are N310=1, N311=1, and timer value T310 is variable (500 milliseconds in this example), as recommended by RAN. A first trace 305 represents in-sync and out-of-sync indicators received from the PHY layer entity in a first case (where the CQI drops below an out-of-sync threshold, recovers, but drops below the out-of-sync threshold again (shown as line 315)) and a second trace 310 represents in-sync and out-of-sync indicators received from the PHY layer entity in a second case (where the CQI drops below the out-of-sync threshold but recovers (shown as line 320)). In both cases 1 and 2, when the CQI drops below the out-of-sync threshold, out-of-sync indicators (indicators 325 and 327) are sent to the upper layer entity. When the CQI recovers and goes back above the out-of-sync threshold, the PHY layer entity stops sending the out-of-sync indicators, but because the CQI is below the in-sync threshold, the PHY layer entity does not send any in-sync indicators. In case 2, when the CQI goes above the in-sync threshold, the PHY layer entity sends in-sync indicators (indicators 329) to the upper layer entity. After N311 in sync indicators are sent to the upper layer entity, timer T310 is stopped. In case 1, when the CQI drops below the out-of-sync threshold again, the PHY layer entity sends out-of-sync indicators (indicators 331) to the upper layer entity. After timer T310 expires and the upper layer entity is still receiving out-of-sync indicators, a RLF is detected.

Figure 4:
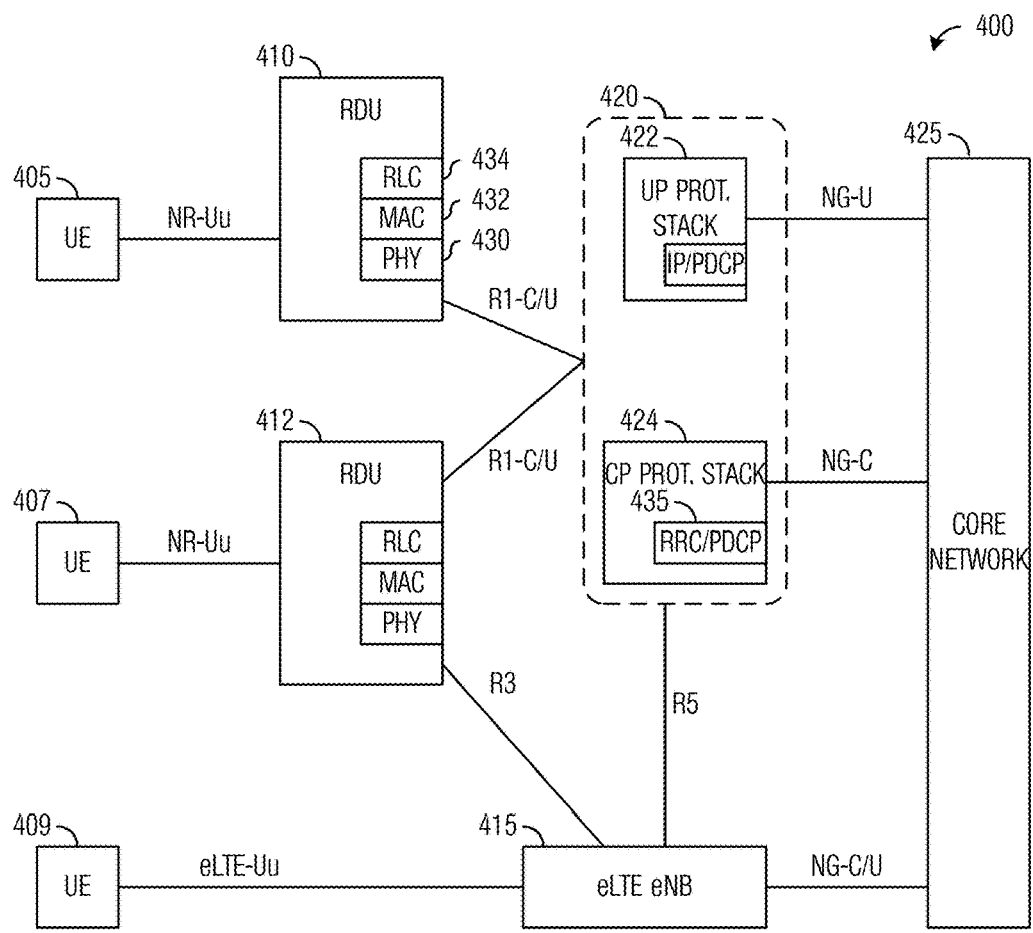
FIG. 4 shows an example communications system highlighting New Radio (NR) system design according to example embodiments described herein.

FIG. 4 shows an example communications system 400 highlighting New Radio (NR) system design. Communications system 400 is a 5G cellular system, following a NR design. Communications system 400 includes a plurality of user equipments (UEs), such as UE 405, UE 407, and UE 409. Communications system 400 also includes radio distributed units (RDUs), such as RDU 410 and RDU 412. Communications system 400 also includes an enhanced LTE (eLTE) evolved NodeB (eNB) 415 that serves UE 409, for example, without utilizing the NR design. Communications system 400 also includes a radio centralized unit (RCU) 420, which includes a user plane (UP) protocol stack 422 and a control plane (CP) protocol stack 424. RCU 420 is connected to the RDUs, as well as eLTE eNB 415 and core network (CN) 425.

While it is understood that communications systems may employ multiple network entities capable of communicating with a number of UEs, only two RDUs and one eLTE eNB, and three UEs are illustrated for simplicity. In addition, it should be understood that the network topology in FIG. 4 is exemplary, and particular networks may embody different topologies. For instance, the RDUs of a communications system might not connect directly to the eNBs of an eLTE system (interface R3 in the figure), and some 5G cellular systems could operate in a so-called "standalone" mode without interworking with any neighbouring eLTE system. Therefore, the communications system shown in FIG. 4 should not be construed as being limiting to either the scope or spirit of the example embodiments.

As discussed previously, RDUs implement a portion of the control plane protocol stack. As shown in FIG. 4, the RDUs include PHY sublayer, MAC sublayer, and radio link control (RLC) sublayer entities. As an illustrative example, RDU 410 includes PHY sublayer entity 430, MAC sublayer entity 432, and RLC sublayer entity 434. The UP functional entities within the RCUs (indicated in FIG. 4 as "UP") also implement a portion of the user plane protocol stack. As shown in FIG. 4, the RCUs and the UP entities implement IP/PDCP sublayer entities. As an illustrative example, RCU CP protocol stack 424 includes IP/PDCP sublayer entity 435.

Communications system 400, as shown in FIG. 4, illustrates a hierarchical model of the NR design for a 5G cellular system, with one RCU managing many RDUs (e.g., RCU 420 managing RDUs 410 and 412). The hierarchical model shown in FIG. 4 illustrates a centralized RCU and distributed RDUs. Although the NR design may be extended to situations with more than one RCU, FIG. 4 focusses on the portion of an NR radio access network under the management of one RCU. In general, a UE is served by a RDU, and as a UE moves around, the link between UE and RDU is relocated or switched to different RDUs. It is noted that Layer 3 control is located at the RCU as the anchor point for the RRC protocol layer. As a result, the relocation of the UE's link to a different RDU under the control of the same RCU does not require a corresponding relocation of the layer 3 anchor point for the UE.

However, the locating of the Layer 3 in the RCU may lead to long latency for air interface signaling when layer 3 procedures are used. The signaling exchange between the RCU and the RDU is not amenable in situations that involve delay sensitive signaling or services. The magnitude of delay involved depends on various factors such as the transport used for the RCU-RDU interface (R1-C/R1-U interface in FIG. 4), the amount of network load managed by the RCU, etc.

Layer 2 protocol sublayers are split between the RCU and the RDU so that a first sublayer of packet processing (the PDCP sublayer) as well as security is located in the RCU and the MAC and PHY sublayers are located in the RDU. The reliability sublayer (the RLC sublayer) may be located in either the RCU or the RDU (although shown being located in the RDU in FIG. 4). In some situations, the locating of the RLC sublayer in the RCU, or even dividing RLC functionality between the RCU and RDU, may be effective. Other layers or sublayers may be present, but are not shown. The Layer 2 sublayers may for convenience be described as layers.

Terminology used herein include:

Transmit-receive point (TRP): a device capable of transmitting and receiving, also referred to as a remote radio unit (RRU) or transmission-reception point;

RCU: a central entity for control (both CP and UP), and packet data convergence protocol (PDCP) and/or RRC. Logically, one RCU can include multiple cell anchor points (as defined below);

RDU: a distributed entity for remote deployment. One RDU can be connected with multiple RRUs or TRPs. MAC/PHY sublayers are located at the RDU;

Physical cell: a sector of a RRU/TRP, or cluster of RRU/TRP. As defined for a traditional cell, the identity of physical cell (PCI) is unique in a limited coverage; and Cell anchor point: a Layer 3 management concept for cell at the RRC layer and S1 interface. Includes UE tracking at idle state (paging). One cell anchor point can be mapped to multiple physical cells (defined at Layer 2). Globally unique cell ID (e.g., cell global ID (CGI) in 3GPP LTE) could be at Layer 3.

Figure 5:
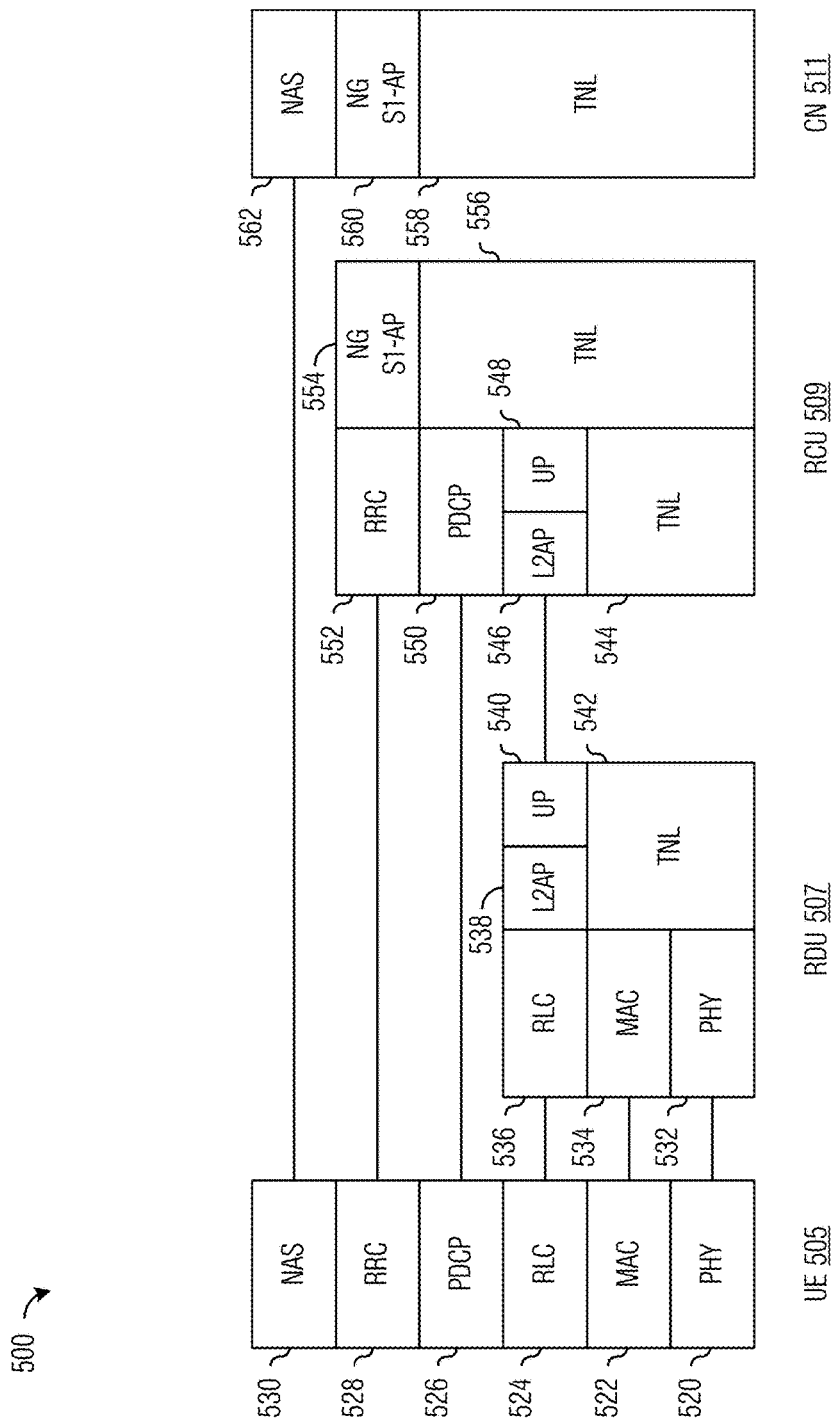
FIG. 5 illustrates example protocol architecture of devices participating in recovery from a RLF or HOF according to example embodiments described herein.

FIG. 5 illustrates example protocol architecture 500 of devices participating in recovery from a RLF or HOF. Protocol architecture 500 includes protocol stacks of a UE 505, a RDU 507, a RCU 509, and a CN 511. The protocol stack of UE 505 includes a PHY layer entity 520, a MAC layer entity 522, a RLC layer entity 524, a PDCP layer entity 526, a RRC layer entity 528, and a NAS layer entity 530. The protocol stack of RDU 507 includes a PHY layer entity 532, a MAC layer entity 534, a RLC layer entity 536, a Layer 2 application protocol (L2AP) entity 538, a UP entity 540, and a tunneling (TNL) entity 542. The protocol stack of RCU 509 includes a first TNL entity 544, a L2AP entity 546, a PDCP entity 550, a RRC entity 552, a next generation S1 interface application protocol (NG S1-AP) entity 554, and a second TNL entity 556. The protocol stack of CN 511 includes a TNL entity 558, a NG S1-AP entity 560, and a NAS entity 562.

L2AP and UP are new adaptation layers that support exchanges between RDU 507 and RCU 509. The L2AP adaptation layer supports control signaling (e.g., based on stream control transmission protocol/Internet protocol (SCTP/IP)) between RDU 507 and RCU 509. The UP adaptation layer supports the delivery of user data flows (e.g., based on general packet radio service (GPRS) tunneling protocol—user (GTP-U)/user datagram protocol (UDP)/Internet protocol (IP)) between RLC and PDCP layer entities.

Figure 6:
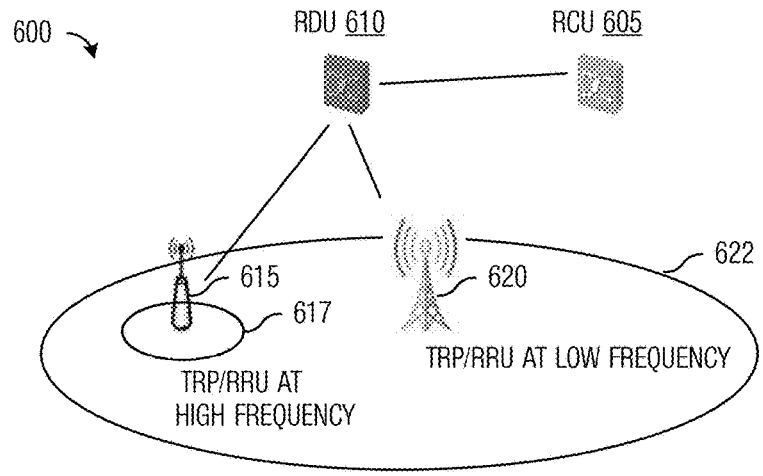
FIG. 6 illustrates an example communications system according to example embodiments described herein.

FIG. 6 illustrates an example communications system 600. Communications system 600 is a multi-layer network deployment with different carriers. Communications system 600 includes a RCU 605 controlling a plurality of RDUs, including RDU 610. The RDUs can support inter-frequency deployments of TRPs or RRUs. Each RDU controls one or more TRPs or RRUs. As shown in FIG. 6, RDU 610 is controlling a first TRP 615 and a second TRP 620. First TRP 615 operates at a high frequency with coverage area 617 and second TRP 620 operates at a lower frequency with coverage area 622. Although communications system 600 is shown with only 1 RCU, 1 RDU, and 2 TRPs, the example embodiments presented herein are operable in communications systems with any number of RCUs, RDUs, and TRPs. Therefore, the discussion of communications system 600 should not be construed as being limiting to either the scope or the spirit of the example embodiments.

RRC integrity protection between a UE and an eNB is provided by the PDCP layer. No layers below the PDCP are integrity protected. The input parameters to an RRC integrity protection function (a 128-bit evolved packet system (EPS) integrity algorithms (EIA)) as described in Annex B of the 3GPP TS 33.401 technical standards are:

KEY—128-bit integrity key $K_{RRCint}$;

BEARER—5-bit bearer identity;

DIRECTION—1-bit direction (uplink/downlink); and

COUNT—32-bit bearer-specific counter, corresponds to the 32-bit PDCP count.

Figure 7:
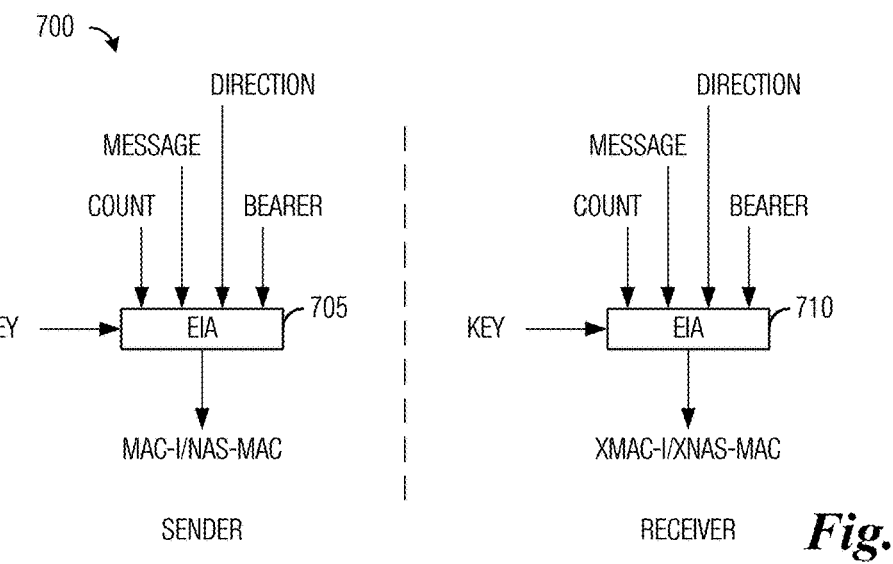
FIG. 7 illustrates the evolved packet system (EPS) integrity algorithms (EIA) of a transmitter and a receiver.

FIG. 7 illustrates the integrity processing 700 using the EIA functions 705 and 710 of a transmitter and a receiver, respectively. EIA function 705 produces a MAC-I/NAS-MAC as output, while EIA function 710 produces an XMAC-I/XNAS-MAC as output. It is noted that the inputs to EIA function 705 at the transmitter and EIA function 710 at the receiver are similar.

Similarly, the input parameters to an RRC confidentiality protection function are:

KEY—128-bit integrity key $K_{RRCene}$;

BEARER—5-bit bearer identity;

DIRECTION—1-bit direction (uplink/downlink);

COUNT—32-bit bearer-specific counter, corresponds to the 32-bit PDCP count; and

LENGTH—the length of the keystream required.

The re-establishment of a RRC connection requires several keys and tokens. A serving eNB may prepare a plurality of $K_{eNB}$*s and tokens (such as shortMAC-I) for multiple cells which are under the control of a target eNB. The serving eNB may prepare cells belonging to the serving eNB as well as cells belonging to one or more neighbour eNBs. The preparation of these cells includes sending the security context containing the $K_{eNB}$*s and tokens to each cell for which the keys and tokens were prepared, as well as the corresponding next-hop chaining count (NCC), the EPS security capabilities of the UE, and the security algorithms used in the serving cell for determining the tokens, to the target eNB. In order to calculate the token, the serving eNB uses a negotiated EIA algorithm from the AS security context from the serving eNB with the following inputs:

Abstract syntax notation (ASN.1) encoded structure containing the source cell radio network temporary identifier (C-RNTI);

Source PCI; and

Target cell ID as defined by VarShortMAC-Input in technical standard TS 36.331, where source PCI and source C-RNTI are associated with a cell the UE last had an active RRC connection with and target cell ID is the identity of the target cell where the RRCConnectionReestablishmentRequest is sent to. At the time when the token is computed, the source cell in these definitions refers to the serving cell. For the specific purpose of computing the short MAC-I, when certain parameter values are not available or not meaningful, the parameters of the EIA-algorithm are set as follows: KEY=$K_{RRCint}$ of the source cell, all BEARER bits are set to 1, DIRECTION bit is set to 1, all COUNT bits are set to 1. The token will be the 16 least significant bits of the output of the EIA-algorithm with these parameters.

According to an example embodiment, a NR RLF occurs when a specified number of consecutive out-of-sync (OOS) indications are received in a Layer 2 entity of a RDU (instead of in a Layer 3 entity of a RCU). A filter is applied to in-sync (IS) indications similar to the filtering specified in 3GPP TS 36.331 before expiration of timer T310. However, the filter is applied in Layer 2 rather in Layer 3. If filtering is used in Layer 1, the traditional Layer 3 count N310 to smooth out any false alarm at the upper layers may also be changed to a count mechanism for Layer 2 filtering at the RDU.

Different radio link re-establishment cases include:

Case 1: radio link re-establishment with a cell served by the same RDU;

Case 2: radio link re-establishment with a cell served by a different RDU that is connected to the same RCU; and Case 3: radio link re-establishment with a cell served by a different RDU that is connected to a different RCU.

A physical cell identifier (a Layer 2 cell ID, for example) is used to identify the cell in Layer 2, similar to a PCI in 3GPP LTE. The RDU may host multiple cells, e.g., one cell per TRP, or a single cell with multiple cooperating TRPs. A RCU identifier (e.g., RCU ID) is used to identify the RCU, and a RDU identifier (e.g., RDU ID) is used to identify the RDU. A cell anchor point identifier (e.g., cell anchor point ID) may be defined as RCU ID+Layer 2 cell ID. Alternatively, a cell anchor point ID may be defined as RCU ID+RDU ID, meaning that one cell anchor point may be mapped to all of the cells within one RDU. A Layer 2 identifier (e.g., Layer 2 ID) for the UE can be allocated by the RDU, such as the C-RNTI is allocated by the MAC layer in 3GPP LTE. Examples of regionally scoped identifiers derived from the Layer 2 ID for the UE include: Layer 2 ID+RDU ID (yielding a unique identifier for the UE within the RCU) or Layer 2 ID+RDU ID+RCU ID (yielding a unique identifier for the UE in a larger area, e.g., a public land mobile network (PLMN)).

According to an example embodiment, in a situation when both a source RDU and a target RDU are controlled by the same RCU (i.e., cases 1 and 2 mentioned above), a UE first attempts a Layer 2 radio link re-establish attempt that involves a resetting of Layer 2 entities and sending Layer 2 signaling to the first and/or best RDU that it is able to find after a link failure. The target RDU may need to be prepared by the RCU, i.e., the UE context is sent from the RCU to the target RDU. Alternatively, the target RDU can request the UE context directly from the RCU. A particularly robust solution involves both, with the RCU configuring RDUs with a re-establishment context for Layer 2, but if the RDU does not recognize the UE, the RDU can request the UE context from the RCU.

Therefore, the Layer 2 radio link re-establishment may have 3 possible responses: succeed, reject, and try at Layer 3. A "reject" response may mean for the target RDU to stop requesting Layer 2 radio link re-establishment (because the target RDU does not have the UE context, for example) and to attempt a Layer 3 radio link re-establishment, while "succeed" and "try at Layer 3" responses are self-explanatory.

Example steps involved in a Layer 2 radio link re-establishment include:

Step 1: A Layer 2 radio link re-establishment procedure is initiated by a UE, and the UE re-establishes RLC and resets the MAC layer entity. The legacy RLC re-establishment procedure and MAC layer entity reset procedure may be followed unless new RLC and/or MAC layer functionalities are defined in NR system design;

Step 2: The UE detects a target RDU and accesses the target RDU. The source RDU and the target RDU share the same cell anchor ID (e.g., Layer 3 cell ID) in this situation, but different physical (Layer 2) cell IDs;

Step 3: The Layer 1 and Layer 2 configuration of the target RDU are preconfigured for the UE by the RCU. In 3GPP LTE, the Layer 2 configuration is changed through RRC reconfiguration, which involves a significant amount of signaling. If a signaling protocol is defined for the interface between RCU and RDU (e.g., X5AP), the reconfiguration may be delivered through the newly defined signaling protocol;

Step 4: The UE sends a Layer 2 message to the target RDU to request a Layer 2 radio link re-establishment. The Layer 2 message contains the identifier of the UE allocated by the RCU (such as the C-RNTI), an authentication identifier (such as shortMAC-I), as well as a cell identifier for the source RDU (such as PCI or cell anchor ID). It is noted that PCI is sufficient information (instead of cell anchor ID) if the UE knows that it is communicating with the target RDU that is under the same source RCU;

Step 5: The target RDU needs the UE context including the identifier of the UE and authentication token. After verifying the validity of the UE, the target RDU transmits the downlink data immediately without Layer 2 feedback. The downlink data may be placed into the Layer 2 reconfiguration message if there is sufficient space. Otherwise, UP bearers are first established; and Step 6: After receiving the Layer 2 re-establishment message, the target RDU verifies the validity of the UE based on the token from the Layer 2 re-establishment message, e.g., in a MAC Control Element (CE). The source RDU may submit the PDCP status report to the RCU. Based on the PDCP status report, the RCU transmits unsuccessfully received PDCP PDUs and the new PDCP PDUs to the target RDU.

With respect to downlink transmissions, the Layer 2 radio link re-establishment sets up a new MAC layer entity (if a separate MAC layer entity is organized for the TRP (or RRU) where the re-establishment procedure is targeting for) and a new RLC entity. The radio bearer (RB) for the downlink data may be suspended during the re-establishment period, meaning that the downlink data is buffered at the RCU, in the PDCP layer. There is no need to re-order the packets at the PDCP layer because the RCU (the PDCP layer thereof) can recover the delivery of packets to the new RLC entity when the Layer 2 radio link is established with the target RDU (the RCU can send all of the packets that were not acknowledged, for example).

The downlink data that was in transit but not acknowledged during the RLF period (before the RB was suspended) needs to be forwarded. A first option for forwarding such downlink data involves storing the PDCP PDUs in the RCU until the RLC entity confirms all segments are acknowledged. A second option for forwarding such downlink data involves the RLC entity in the source RDU forwarding unacknowledged PDUs to the target RDU (either through a direct interface or through the RCU).

Figure 8:
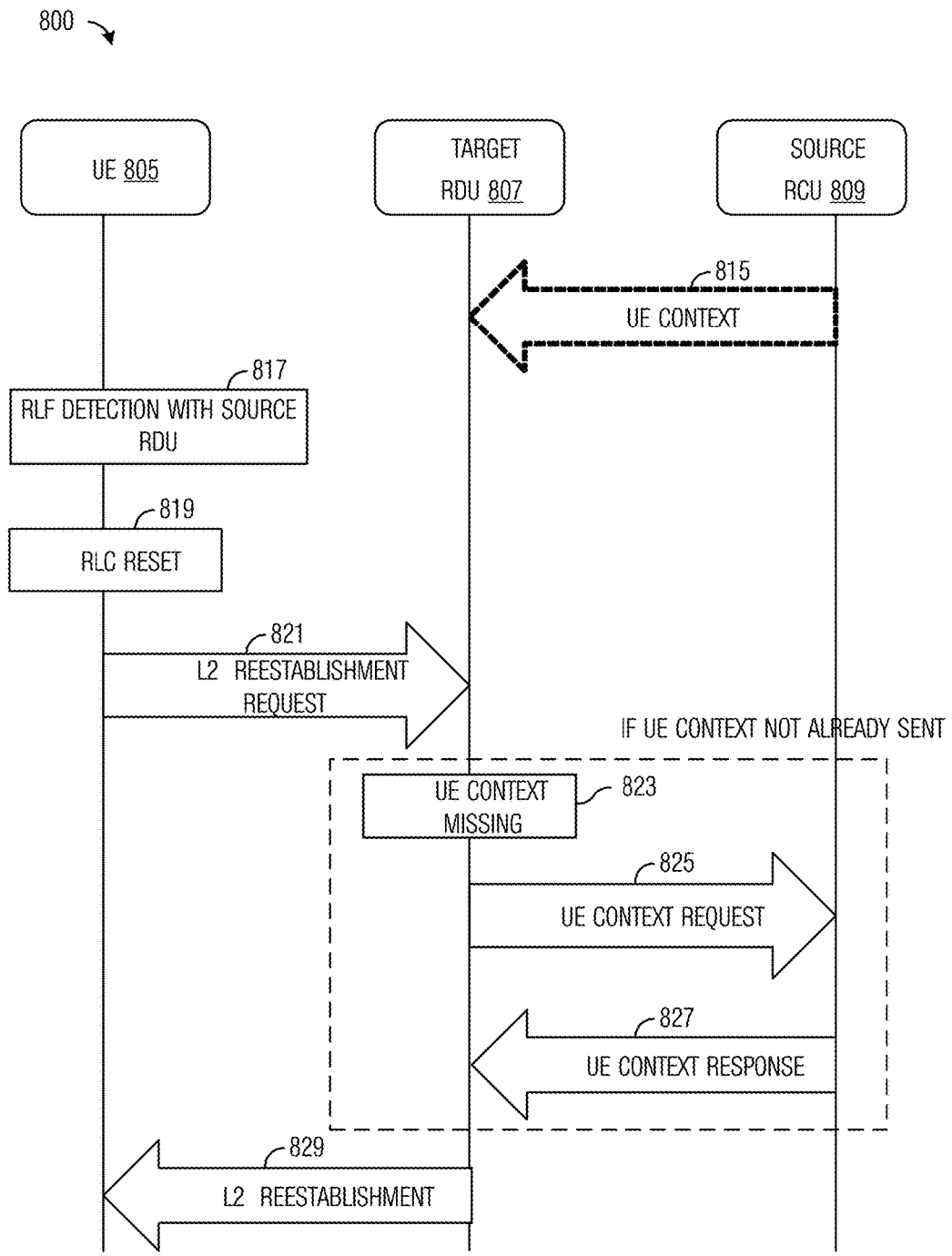
FIG. 8 illustrates a diagram of messages exchanged and processing performed by devices participating in a NR Layer 2 radio link re-establishment process according to example embodiments described herein.

FIG. 8 illustrates a diagram 800 of messages exchanged and processing performed by devices participating in a NR Layer 2 radio link re-establishment process. Diagram 800 highlights messages exchanged and processing performed by a UE 805, a target RDU 807, and a source RCU 809.

Source RCU 809 may provide the UE context of UE 805 to target RDU 807 if available (event 815). UE 805 detects a RLF with a source RDU (block 817). The RLF detection is performed at Layer 2. UE 805 resets the RLC entity (block 819) and transmits a Layer 2 radio link re-establishment request message to target RDU 807 (event 821). In a situation where the target RDU 807 does not have the UE context of UE 805 (such as if source RCU 809 did not have the UE context of UE 805, thereby preventing occurrence of event 815), the target RDU 807 determines that it does not have the UE context of UE 805 (block 823) and transmits a UE context request to source RCU 809 (event 825). Source RCU 809 transmits the UE context of UE 805 to target RDU 807 (event 827). Hence, if event 815 occurred successfully and target RDU 807 has the UE context of UE 805, block 823 and events 825 and 827 do not occur. Target RDU 805 transmits a Layer 2 radio link re-establishment response message to UE 805 (block 829) and UE 805 and target RDU 807 complete the Layer 2 radio link re-establishment process.

Figure 9:
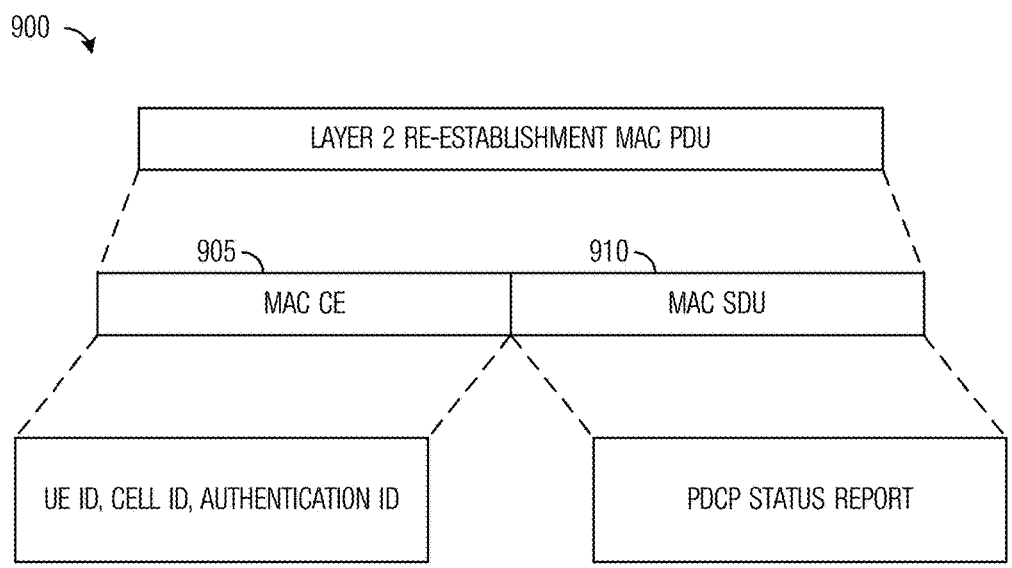
FIG. 9 illustrates an example format of a Layer 2 radio link re-establishment PDU according to example embodiments described herein.

FIG. 9 illustrates an example format of a Layer 2 radio link re-establishment PDU 900. Layer 2 radio link re-establishment PDU 900 may be included in a Layer 2 radio link re-establishment request message or a Layer 2 radio link re-establishment response message. Layer 2 radio link re-establishment PDU 900 includes a MAC CE 905 and a MAC service data unit (SDU) 910. MAC CE 905 includes the UE identifier, the cell identifier, and the authentication identifier. MAC SDU 910 includes the PDCP status report.

After receiving the Layer 2 radio link re-establishment request message, the target RDU is able to verify the validity of the UE based on the authentication identifier contained in the MAC CE 905. The authentication identifier may be similar to the shortMAC-I used in 3GPP LTE. The target RDU is also able to submit the PDCP status report contained in the MAC SDU 910 to the RCU. The RCU, based on the PDCP status report, transfers the unsuccessfully received PDCP PDUs and the newly arrived PDCP PDUs to the target RDU. The UE identifier and the cell identifier are for the source RDU. In a situation when the UE knows that the target RDU is under the same RCU, the UE does not need to include the RCU identifier.

According to an example embodiment, in a situation where radio link re-establishment is with a cell served by a different RDU that is connected to a different RCU (Case 3 as discussed above), the UE transmits a cell anchor point identifier (e.g., RCU ID+Layer 2 cell ID) to the target RDU together with a Layer 2 UE identifier and shortMAC-I. The target RDU knows that the RCU (the source RCU) and RDU (the source RDU) associated with the UE are different from itself and its connected RCU (the target RCU) when the cell anchor point identifier is resolved. The target RDU sends a message to the UE with a newly allocated Layer 2 identifier. The target RDU rejects the Layer 2 radio link re-establishment message and transfers the radio link re-establishment message to Layer 3. At the UE, the UE is preparing and transmitting a Layer 3 radio link re-establishment message to the target RCU. The target RDU transmits a message to the target RCU with the cell anchor point identifier and the target RCU routes the message to the source RCU. The source RCU responds with a UE context to the target RCU. The target RCU initiates a Layer 3 radio link re-establishment with a new PDCP entity. The target RCU also allocates a new cell anchor point identifier for the connection. A Layer 3 radio link re-establishment configuration information is transmitted to the UE using RRC signaling. Alternatively, it is possible to avoid over the air signaling for Layer 3 radio link re-establishment if the target RDU triggers the target RCU to initiate the Layer 3 radio link re-establishment as shown later in the discussion.

Figure 10:
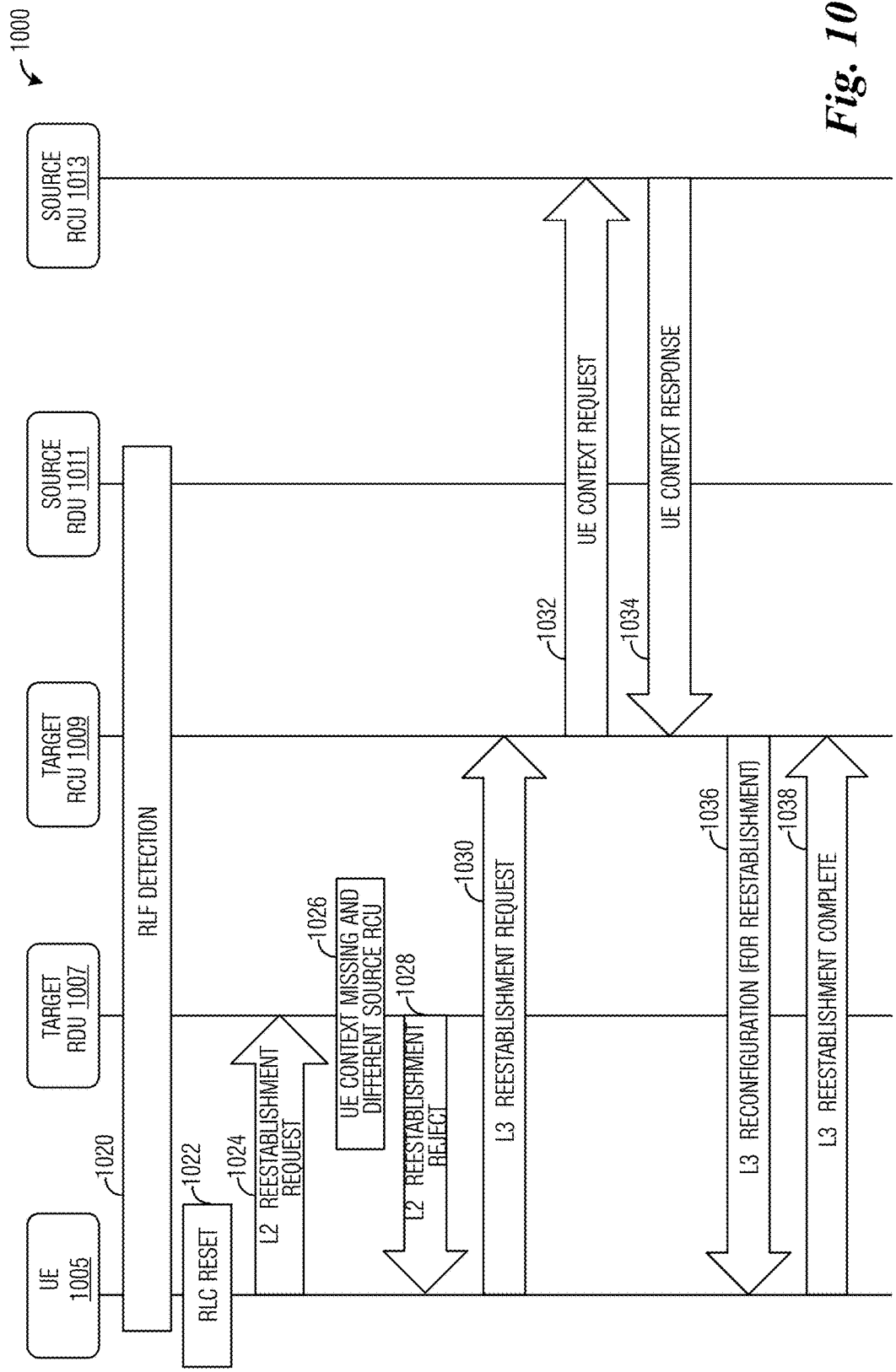
FIG. 10 illustrates a diagram of messages exchanged and processing performed by devices participating in a NR Layer 2 radio link re-establishment process where the target cell is connected to different RDU and RCU according to example embodiments described herein.

FIG. 10 illustrates a diagram 1000 of messages exchanged and processing performed by devices participating in a NR Layer 2 radio link re-establishment process where the target cell is connected to different RDU and RCU. Diagram 1000 highlights messages exchanged and processing performed by a UE 1005, a target RDU 1007, a target RCU 1009, a source RDU 1011, and a source RCU 1013.

UE 1005, target RDU 1007, target RCU 1009, and source RDU 1011 participate in detecting a RLF (block 1020). Upon detecting the RLF, UE 1005 resets the RLC entity (block 1022) and transmits a Layer 2 radio link re-establishment request message to target RDU 1007 (event 1024). Target RDU 1007 determines that the UE context of UE 1005 is missing and that UE 1005 is associated with a different RCU (source RCU 1013 instead of target RCU 1009) by resolving the cell anchor point identifier included in the Layer 2 radio link re-establishment request message (block 1026). Target RDU 1007 rejects the Layer 2 radio link re-establishment request by transmitting a Layer 2 radio link re-establishment response message with a reject response to UE 1005 (event 1028). The reject response may comprise an indication that the UE should attempt re-establishment at Layer 3.

Receipt of the Layer 2 radio link re-establishment response message with a reject response results in UE 1005 transmitting a Layer 3 radio link re-establishment request to target RCU 1009 (event 1030). Target RCU 1009 transmits a UE context request message for UE 1005 to source RCU 1013 (event 1032) and receives the UE context of UE 1005 from source RCU 1013 (event 1034). Target RCU transmits Layer 3 radio link re-establishment configuration information to UE 1005 (event 1036) and UE 1005 transmits a Layer 3 radio link re-establishment complete message to target RCU 1009 to complete the Layer 3 radio link re-establishment process (event 1038).

Figure 11:
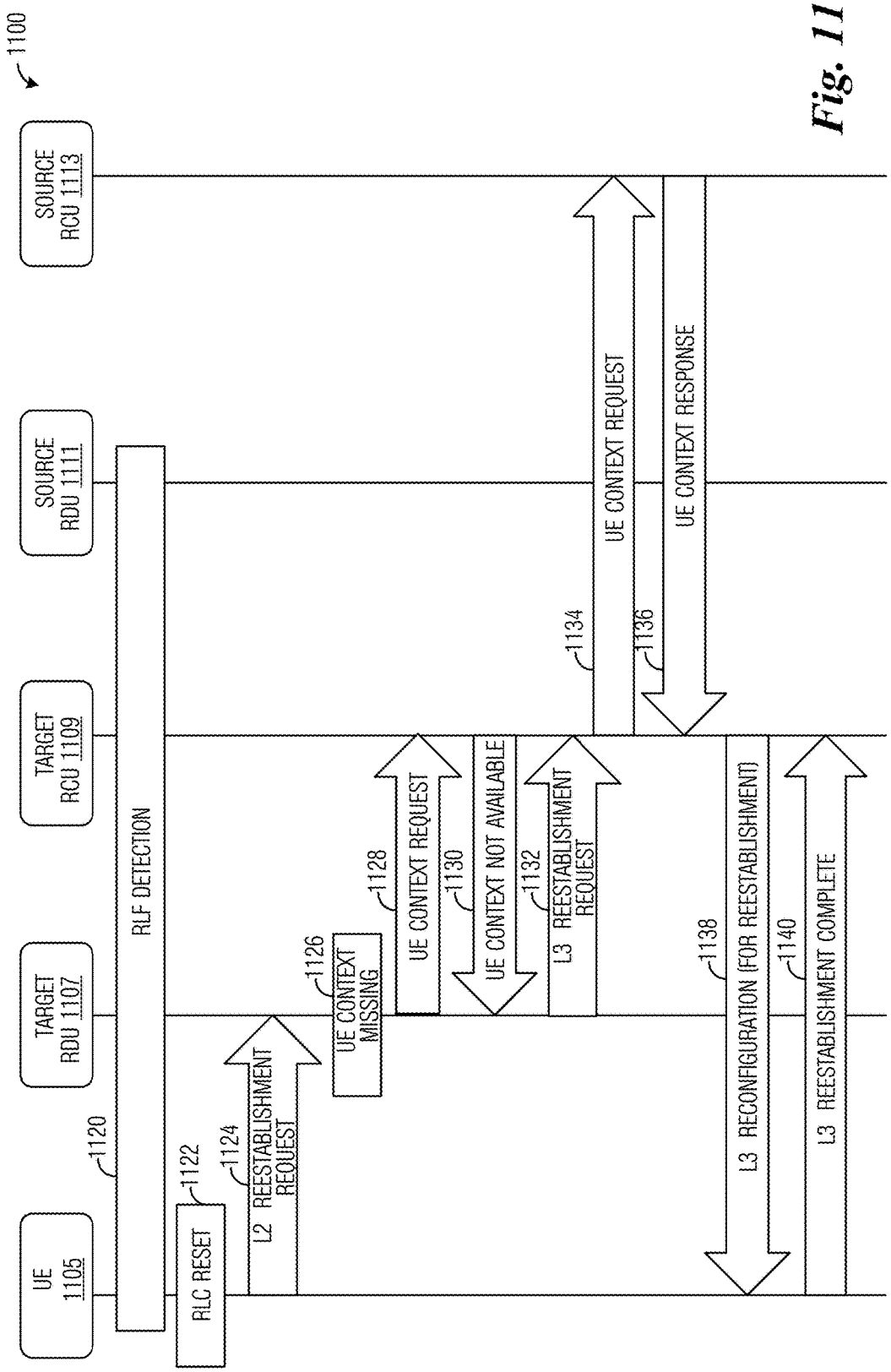
FIG. 11 illustrates a diagram of messages exchanged and processing performed by devices participating in a NR Layer 2 radio link re-establishment process where the target cell is connected to different RDU and RCU and a target RDU initiates a Layer 3 radio link re-establishment according to example embodiments described herein.

FIG. 11 illustrates a diagram 1100 of messages exchanged and processing performed by devices participating in a NR Layer 2 radio link re-establishment process where the target cell is connected to different RDU and RCU and a target RDU initiates a Layer 3 radio link re-establishment responsive to its inability to complete a Layer 2 re-establishment process. Diagram 1100 highlights messages exchanged and processing performed by a UE 1105, a target RDU 1107, a target RCU 1109, a source RDU 1111, and a source RCU 1113.

UE 1105 and source RDU 1111 participate in detecting a RLF (block 1120). Upon detecting the RLF, UE 1105 resets the RLC entity (block 1122) and transmits a Layer 2 radio link re-establishment request message to target RDU 1107 (event 1124). Target RDU 1107 determines that the UE context of UE 1105 is missing (block 1126). Target RDU 1107 transmits a UE context request to target RCU 1109 (event 1128) and target RCU 1109 transmits a UE context not available message to target RDU 1107 (event 1130). Target RDU 1107 transmits a Layer 3 radio link re-establishment request message to target RCU 1109 (event 1132). Target RCU 1109 transmits a UE context request for UE 1105 to source RCU 1113 (event 1134) and source RCU 1113 transmits a UE context response with the UE context of UE 1105 to target RCU 1109 (event 1136). Target RCU 1109 transmits Layer 3 radio link re-establishment configuration information to UE 1105 (event 1138) and UE 1105 transmits a Layer 3 radio link re-establishment complete message to target RCU 1109 to complete the Layer 3 radio link re-establishment process (event 1140).

In the situation when both the source cell and the target cell are controlled by the same RCU, the RCU can share some UE context with the connected RDUs related to the UE to avoid the target RDU having to fetch the UE context. The target RDU receives the Layer 2 radio link re-establishment request with the UE context, which includes the authentication identifier (e.g., shortMAC-I), the Layer 2 identifier, target cell PCI (e.g., Layer 2 cell identifier). If the UE context has been prepared by the RCU, the UE context already has the authentication identifier. If the UE context does not already have the authentication identifier, the Layer 2 radio link re-establishment request identifies the source RDU so that the target RDU can retrieve (or attempt to retrieve) the UE context, including the authentication identifier, from the source RDU for purpose of UE verification. As an example, the generation of the authentication identifier may involve parameters:

KEY set to a key for integrity protection in the source RCU;
All BEARER bits set to 1;
DIRECTION bit set to 1; and
All COUNT bits set to 1.

The message used as input to the integrity function is a message analogous to VarShortMAC-I in 3GPP LTE and includes the Layer 2 identifier of the UE, the PCI of the source RDU, and the target cell anchor point identifier. The input message may be ASN.1 encoded before being delivered to the integrity function for processing. The MAC-I value returned by the integrity function may be truncated, e.g., the 16 least significant bits of the MAC-I may be used.

Some Layer 3 functions and/or signaling are moved to Layer 2 entities at the RDU. Therefore, Layer 2 integrity protection specific to RDU RRC-like messages is desirable. The integrity protection may be needed for reconfiguration messages, but not necessarily critical for re-establishment messages. One possible approach may be to examine the framework of 3GPP LTE security because there is no security mechanism below the PDCP sublayer in 3GPP LTE. The RCU needs to forward KeNB* and next hop (NH) parameter to the RDU. The RDU can determine a key for integrity protection of the signaling following re-establishment based on KeNB* and NH. Alternatively, the RCU determines the key itself, using the RRC integrity key and RDU ID as input to a key derivation function, and transmit the key to the RDU. A similar process may be used herein. The RDU may use a cryptosync function for Layer 2 messaging, such as a counter specific to the signaling radio bearer (SRB) or a long RLC sequence number (sufficiently long to prevent re-use).

Figure 12:
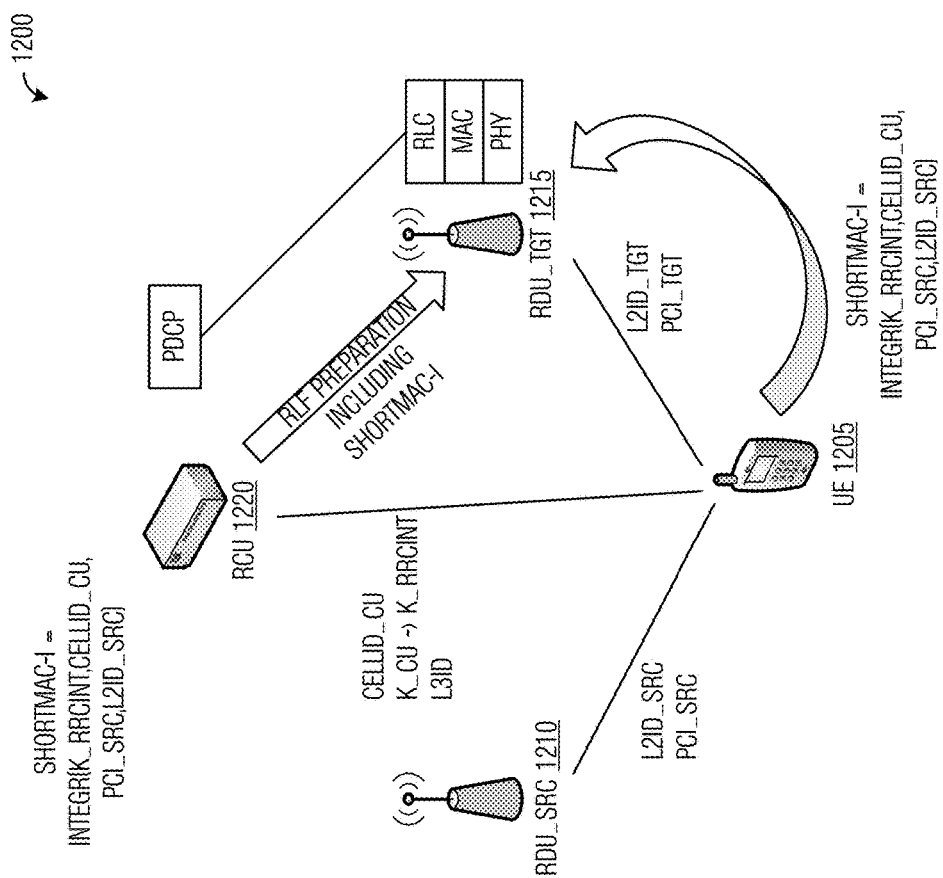
FIG. 12 illustrates a communications system highlighting an example checking of an authentication identifier according to example embodiments described herein.

FIG. 12 illustrates a communications system 1200 highlighting an example checking of an authentication identifier. Communications system 1200 includes a UE 1205 that previously had a radio link with source RDU 1210 (and the radio link has failed) and is re-establishing a radio link with a target RDU 1215, where both RDUs are connected to RCU 1220. Source RDU 1210 has an associated PCI, identified in FIG. 12 as PCI_SRC, and UE 1205 operates in source RDU 1210 with a particular Layer 2 identifier, identified in FIG. 12 as L2ID_SRC. During a communication, such as a re-establishment attempt, UE 1205 delivers to target RDU 1215 an authentication identifier (e.g., shortMAC-I) derived from the Layer 2 identifier and PCI (L2ID_SRC and PCI_SRC, respectively). RCU 1220 and UE 1205 know or can derive the cell anchor identifier, key, and a Layer 3 identifier, allowing them both to determine the authentication identifier. RCU 1220 transmits the authentication identifier (e.g., shortMAC-I) to target RDU 1215 in preparation for the Layer 2 radio link re-establishment process. Target RDU 1215 can compare the authentication identifier value sent by UE 1205 with the value sent by RCU 1220 to confirm the identity of UE 1205.

In the situation when the source cell and the target cell are controlled by different RDUs and different RCUs, the PDCP entity is reset and a new Layer 3 anchor with a new RRC entity is used after radio link re-establishment. A key procedure that is similar to that used in an X2 based handover in 3GPP LTE may be used for the delivery of KeNB*, for example. However, the cell identifier is redefined to adapt to the RCU-RDU split architecture. In general, the target RDU is not able to check the shortMAC-I because the target RDU would not have received the shortMAC-I from the source RCU. If the UE is able to determine that it is under a different RCU, the UE can bypass the Layer 2 radio link re-establishment attempt and proceed directly to the Layer 3 radio link re-establishment process. Otherwise, a network side entity would need to trigger the Layer 3 radio link re-establishment process, as shown in FIG. 11, for example.

Figure 13:
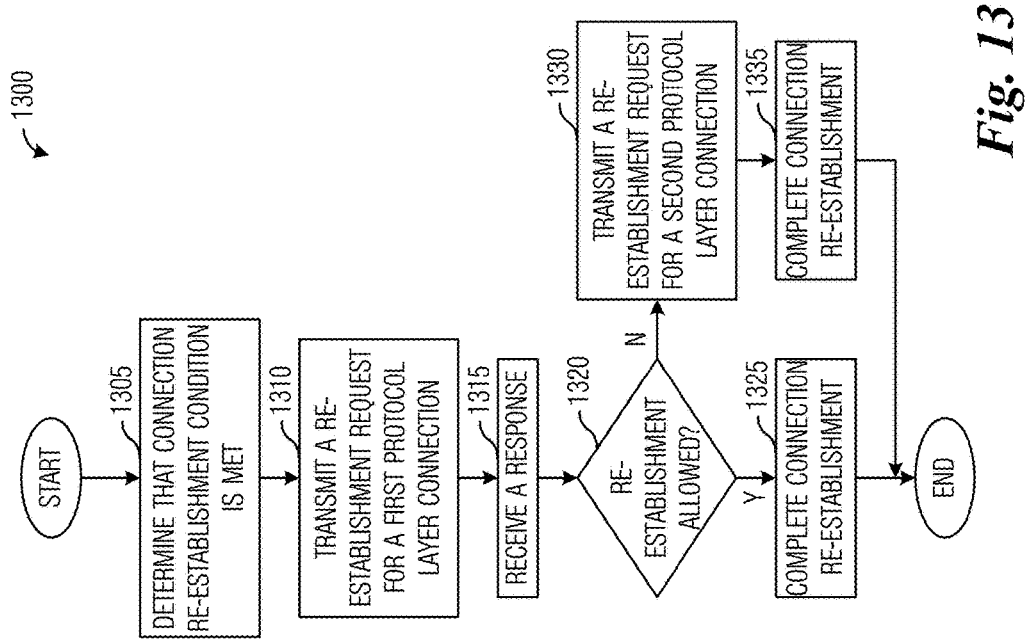
FIG. 13 illustrates a flow diagram of example operations occurring in a UE participating in connection management according to example embodiments described herein.

FIG. 13 illustrates a flow diagram of example operations 1300 occurring in a UE participating in connection management. Operations 1300 may be indicative of operations occurring in a UE as the UE participates in connection management.

Operations 1300 begin with the UE determining that a connection re-establishment condition is met (block 1305). Examples of connection re-establishment condition include a radio link failure, a lower layer failure, a handover failure, and so on. The UE transmits a re-establishment request for a Layer 2 connection (block 1310). The re-establishment request is transmitted to a RDU serving the UE or in the situation of a radio link failure, a target RDU with which the UE is attempting to re-establish a Layer 2 connection. The UE receives a re-establishment response from the RDU (block 1315). The UE performs a check to determine if the re-establishment request is allowed (block 1320). If the re-establishment request is allowed, the UE completes the Layer 2 connection re-establishment by resetting a Layer 2 entity, such as a RLC sublayer entity (block 1325). If the re-establishment request is not allowed, the UE transmits a re-establishment request for a Layer 3 connection (block 1330). The re-establishment request for a Layer 3 connection is transmitted to a RCU controlling the RDU serving the UE. The UE completes the Layer 3 connection re-establishment (block 1335).

Figure 14:
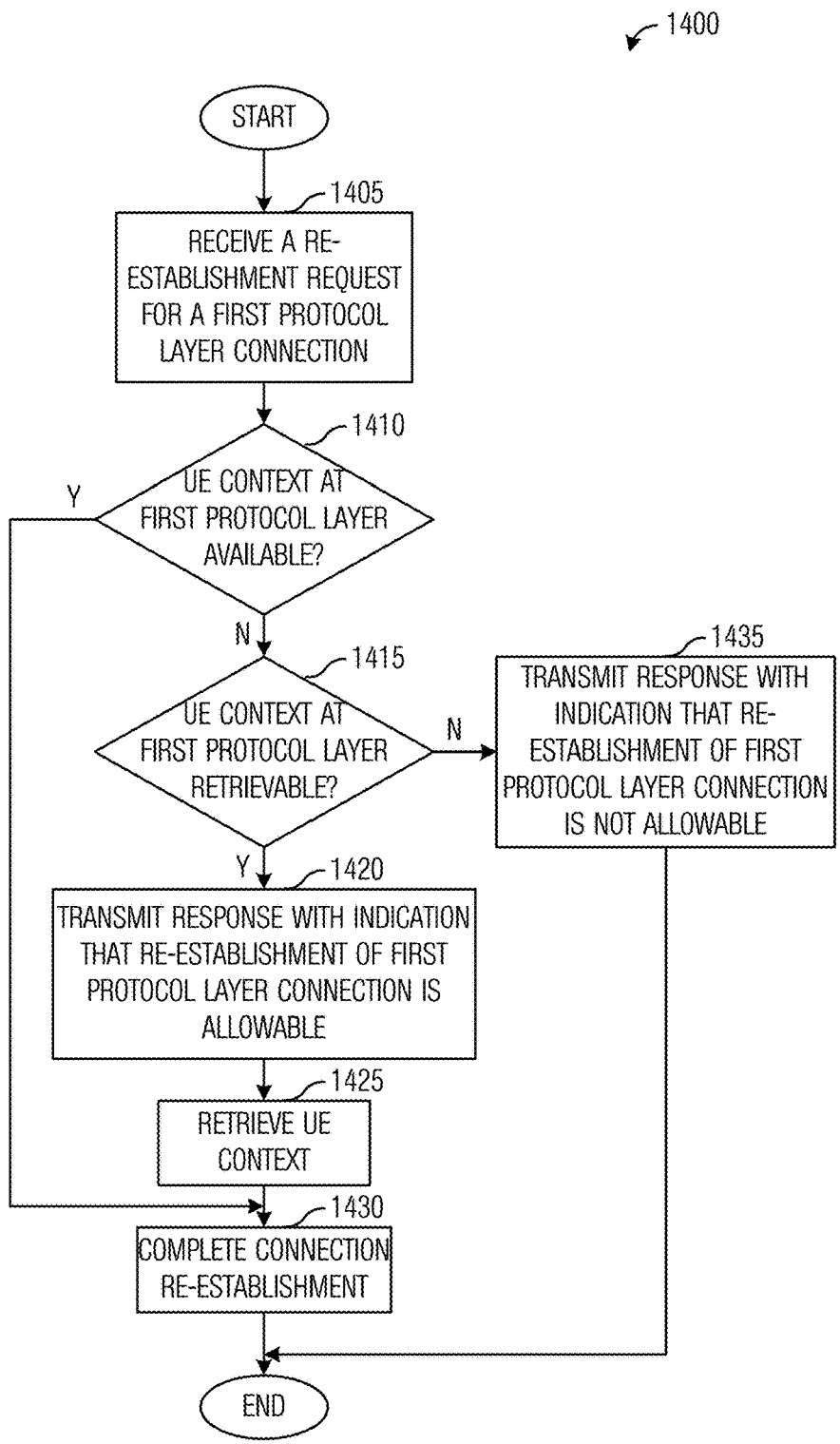
FIG. 14 illustrates a flow diagram of example operations occurring in a RDU participating in connection management according to example embodiments described herein.

FIG. 14 illustrates a flow diagram of example operations 1400 occurring in a RDU participating in connection management. Operations 1400 may be indicative of operations occurring in a RDU as the RDU participates in connection management.

Operations 1400 begin with the RDU receiving a re-establishment request for a Layer 2 connection (block 1405). The re-establishment request is received from a UE served by the RDU or from a UE that wants to re-establish a Layer 2 connection with the RDU. The RDU performs a check to determine if a UE context for the UE is available at the RDU (block 1410). If the UE context for the UE is available at the RDU, the RDU completes the connection re-establishment (block 1430). If the UE context for the UE is not available at the RDU, the RDU performs a check to determine if the UE context for the UE is retrievable from a RCU controlling the RDU (block 1415). If the UE context for the UE is retrievable from the RCU, the RDU transmits a re-establishment response with an indication that the re-establishment request is allowed (block 1420). The RDU retrieves the UE context for the UE (block 1425) and completes the connection re-establishment (block 1430). If the UE context for the UE is not retrievable from the RCU, the RDU transmits a re-establishment response with an indication that the re-establishment request is not allowed (block 1435).

Figure 15:
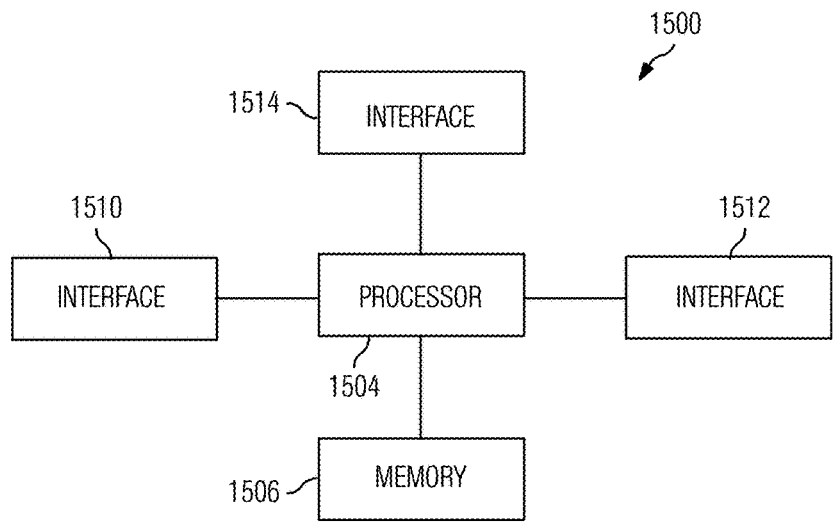
FIG. 15 illustrates a block diagram of an embodiment processing system for performing methods described herein.

FIG. 15 illustrates a block diagram of an embodiment processing system 1500 for performing methods described herein, which may be installed in a host device. As shown, the processing system 1500 includes a processor 1504, a memory 1506, and interfaces 1510-1514, which may (or may not) be arranged as shown in FIG. 15. The processor 1504 may be any component or collection of components adapted to perform computations and/or other processing related tasks, and the memory 1506 may be any component or collection of components adapted to store programming and/or instructions for execution by the processor 1504. In an embodiment, the memory 1506 includes a non-transitory computer readable medium. The interfaces 1510, 1512, 1514 may be any component or collection of components that allow the processing system 1500 to communicate with other devices/components and/or a user. For example, one or more of the interfaces 1510, 1512, 1514 may be adapted to communicate data, control, or management messages from the processor 1504 to applications installed on the host device and/or a remote device. As another example, one or more of the interfaces 1510, 1512, 1514 may be adapted to allow a user or user device (e.g., personal computer (PC), etc.) to interact/communicate with the processing system 1500. The processing system 600 may include additional components not depicted in FIG. 15, such as long term storage (e.g., non-volatile memory, etc.).

In some embodiments, the processing system 1500 is included in a network device that is accessing, or part otherwise of, a telecommunications network. In one example, the processing system 1500 is in a network-side device in a wireless or wireline telecommunications network, such as a base station, a relay station, a scheduler, a controller, a gateway, a router, an applications server, or any other device in the telecommunications network. In other embodiments, the processing system 1500 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 16:
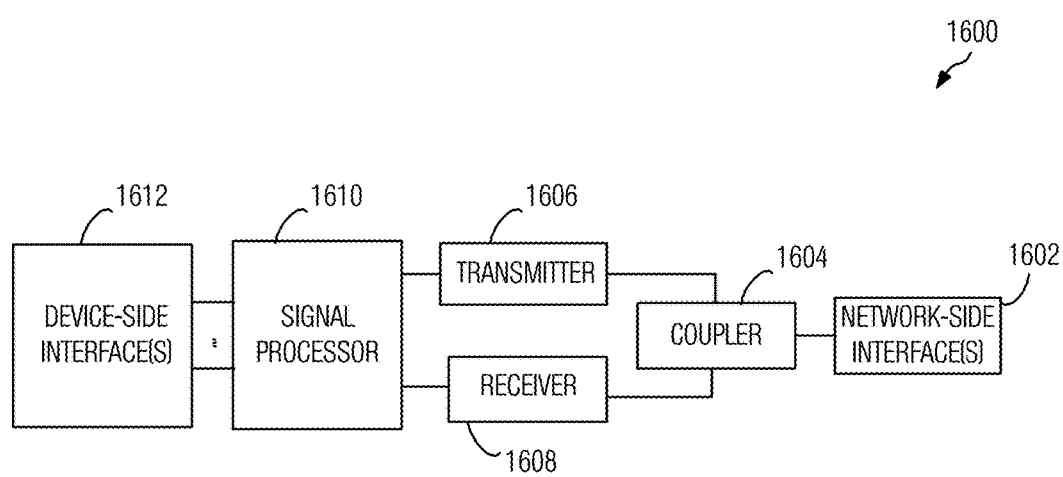
FIG. 16 illustrates a block diagram of a transceiver adapted to transmit and receive signaling over a telecommunications network according to example embodiments described herein.

In some embodiments, one or more of the interfaces 1510, 1512, 1514 connects the processing system 1500 to a transceiver adapted to transmit and receive signaling over the telecommunications network. FIG. 16 illustrates a block diagram of a transceiver 1600 adapted to transmit and receive signaling over a telecommunications network. The transceiver 1600 may be installed in a host device. As shown, the transceiver 1600 comprises a network-side interface 1602, a coupler 1604, a transmitter 1606, a receiver 1608, a signal processor 1610, and a device-side interface 1612. The network-side interface 1602 may include any component or collection of components adapted to transmit or receive signaling over a wireless or wireline telecommunications network. The coupler 1604 may include any component or collection of components adapted to facilitate bi-directional communication over the network-side interface 1602. The transmitter 1606 may include any component or collection of components (e.g., up-converter, power amplifier, etc.) adapted to convert a baseband signal into a modulated carrier signal suitable for transmission over the network-side interface 1602. The receiver 1608 may include any component or collection of components (e.g., down-converter, low noise amplifier, etc.) adapted to convert a carrier signal received over the network-side interface 1602 into a baseband signal. The signal processor 1610 may include any component or collection of components adapted to convert a baseband signal into a data signal suitable for communication over the device-side interface(s) 1612, or vice-versa. The device-side interface(s) 1612 may include any component or collection of components adapted to communicate data-signals between the signal processor 1610 and components within the host device (e.g., the processing system 1500, local area network (LAN) ports, etc.).

The transceiver 1600 may transmit and receive signaling over any type of communications medium. In some embodiments, the transceiver 1600 transmits and receives signaling over a wireless medium. For example, the transceiver 1600 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1602 comprises one or more antenna/radiating elements. For example, the network-side interface 1602 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1600 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit/module, a completing unit/module, a resetting unit/module, and/or a participating unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for connection management, the method comprising:
   detect, by a user equipment (UE), a failure in a UE connection to a network;
   transmitting, by the UE, a re-establishment request for a first connection of a first protocol layer in response to detecting the failure in the UE connection to the network, the first connection being between the UE and a first network device;

receiving, by the UE, a re-establishment response indicating whether a re-establishment of the first connection of the first protocol layer is allowed; and re-establishing, by the UE, the first connection of the first protocol layer in response to the re-establishment of the first connection of the first protocol layer being allowed, a context of a second protocol layer of the UE remaining unchanged during the re-establishment of the first connection of the first protocol layer, the second protocol layer being a higher layer than the first protocol layer.

2. The method of claim 1, wherein the first protocol layer is a Layer 2 network layer.

3. The method of claim 1, wherein the re-establishment request for the first connection of the first protocol layer is transmitted to the first network device.

4. The method of claim 1, wherein re-establishing the first connection of the first protocol layer comprises resetting, by the UE, a first protocol layer entity.

5. The method of claim 1, further comprising participating, by the UE, in a validity check of the UE with the first network device.

6. The method of claim 1, further comprising:
transmitting, by the UE, a second re-establishment request for the first connection of the first protocol layer in response to detecting the failure in the UE connection to the network;

receiving, by the UE, a second re-establishment response indicating whether a second re-establishment of the first connection of the first protocol layer is allowed; and transmitting, by the UE, a third re-establishment request for a second connection of the second protocol layer in response to the second re-establishment of the first connection of the first protocol layer not being allowed.

7. The method of claim 6, wherein the second protocol layer is a Layer 3 network layer.

8. The method of claim 6, wherein the re-establishment request for the first connection of the second protocol layer is transmitted to a second network device.

9. The method of claim 1, wherein the failure in the UE connection to the network comprises at least one of a radio link failure, a lower layer failure, and a handover failure.

10. A method for connection management in a network, the method comprising:
receiving, by a first network device from a user equipment (UE), a re-establishment request for a first connection of a first protocol layer, the re-establishment request indicating a failure in a UE connection to the network, the first connection being between the UE and a first network device;

determining, by the first network device, whether a context of the UE is available at the first network device or whether the context of the UE is retrievable from a second network device; and transmitting, by the first network device, a re-establishment response indicating that a re-establishment of the first connection of the first protocol layer is allowed in response to the context of the UE being available at the first network device or being retrievable from the second network device, a context of a second protocol layer of the UE remaining unchanged during re-establishment of the first connection of the first protocol layer, the second protocol layer being a higher layer than the first protocol layer.

11. The method of claim 10, further comprising re-establishing, by the first network device, the first connection of the first protocol layer.

12. The method of claim 10, further comprising transmitting, by the first network device, a re-establishment request for a second connection of the second protocol layer to the second network device.

13. The method of claim 10, wherein the first protocol layer is a Layer 2 network layer and the second protocol layer is a Layer 3 network layer.

14. The method of claim 10, further comprising checking, by the second network device, a validity of the UE.

15. The method of claim 14, wherein checking the validity of the UE comprises:
deriving, by the first network device, an authentication identifier for the UE in accordance with a radio resource control (RRC) integrity key and an identifier of the first network device; and determining, by the first network device, that the UE is valid in response to the derived authentication identifier of the UE matching an authentication identifier of the UE contained in the context of the UE.

16. The method of claim 10, further comprising determining whether the context of the UE is retrievable from the second network device in response to the context of the UE not being available at the first network device.

17. A user equipment (UE) comprising:
a non-transitory memory storage comprising instructions; and one or more processors in communication with the non-transitory memory storage, wherein the one or more processors execute the instructions to:
detect a failure in a UE connection to a network;
transmit a re-establishment request for a first connection of a first protocol layer in response to the failure in the UE connection to the network, wherein the first connection is between the UE and a first network device;
receive a re-establishment response indicating whether a re-establishment of the first connection of the first protocol layer is allowed; and
re-establish the first connection of the first protocol layer in response to the re-establishment of the first connection of the first protocol layer being allowed, wherein a context of a second protocol layer of the UE remains unchanged during the re-establishment of the first connection of the first protocol layer, and wherein the second protocol layer is a higher layer than the first protocol layer.

18. The UE of claim 17, wherein the one or more processors execute the instructions to:
transmit a second re-establishment request for the first connection of the first protocol layer in response to the failure in the UE connection to the network;
receive a second re-establishment response indicating whether a second re-establishment of the first connection of the first protocol layer is allowed; and
transmit a third re-establishment request for a second connection of the second protocol layer in response to the second re-establishment of the first connection of the first protocol layer not being allowed.

19. The UE of claim 17, wherein the failure in the UE connection to the network comprises at least one of a radio link failure, a lower layer failure, and a handover failure.

20. The UE of claim 17, wherein the one or more processors execute the instructions to reset a first protocol layer entity.

21. A first network device in a network, the first network device comprising:
a non-transitory memory storage comprising instructions; and
one or more processors in communication with the non-transitory memory storage, wherein the one or more processors execute the instructions to:
receive, from a user equipment (UE), a re-establishment request for a first connection of a first protocol layer, wherein the re-establishment request indicates a failure in a UE connection to the network, wherein the first connection is between the UE and the first network device,
determine whether a context of the UE is available at the first network device or whether the context of the UE is retrievable from a second network device, and
transmit a re-establishment response indicating that a re-establishment of the first connection of the first protocol layer is allowed in response to the context of the UE being available at the first network device or being retrievable from the second network device, wherein a context of a second protocol layer of the UE remains unchanged during re-establishment of the first connection of the first protocol layer, and wherein the second protocol layer is a higher layer than the first protocol layer.

22. The first network device of claim 21, wherein the one or more processors execute the instructions to transmit a re-establishment request for a second connection of the second protocol layer to the second network device.

23. The first network device of claim 21, wherein the first network device is a radio distributed unit (RDU), and wherein the second network device is a radio centralized unit (RCU).

24. The first network device of claim 21, wherein the one or more processors execute the instructions to re-establish the first connection of the first protocol layer.

25. The first network device of claim 21, wherein the one or more processors execute the instructions to determine whether the context of the UE is retrievable from the second network device in response to the context of the UE not being available at the first network device.

* * * * *